July 19, 1949.  B. VITEZ  2,476,338

CONSTRUCTION PROTRACTOR

Filed Feb. 1, 1946

Inventor

Bela Vitez

By M. O. Hayes

Attorney

Patented July 19, 1949

2,476,338

UNITED STATES PATENT OFFICE 2,476,338

CONSTRUCTION PROTRACTOR

Bela Vitez, United States Navy

Application February 1, 1946, Serial No. 644,990

1 Claim. (Cl. 33—1)

(Granted under the act of March 3, 1883, as amended April 30, 1928; 370 O. G. 757)

This invention relates to devices for laying out angular constructions on metallic surfaces or the like, and more especially to such devices which will enable impressing punch marks in accurate angular relations with respect to a definite point on any base line.

The construction of angles at present is usually made with triangles, line segment charts, dividers, or vernier protractors, which require a supported straight edge parallel to the base line of the required angle.

The object of the present invention is to eliminate the necessity of using all these instruments by providing a protractor that will simplify the laying out of angles speedily and accurately.

Another object is to provide a simple protractor device for enabling quick placement of punch marks in accurate angular relation to a base line and any point thereon.

Another object is to make a circular protractor having bores at its center and at 10 degree intervals around its edge, and diametrically opposed scale graduations, and a center punch having a shank to slide freely but with negligible clearance through said bores.

Figure 1:
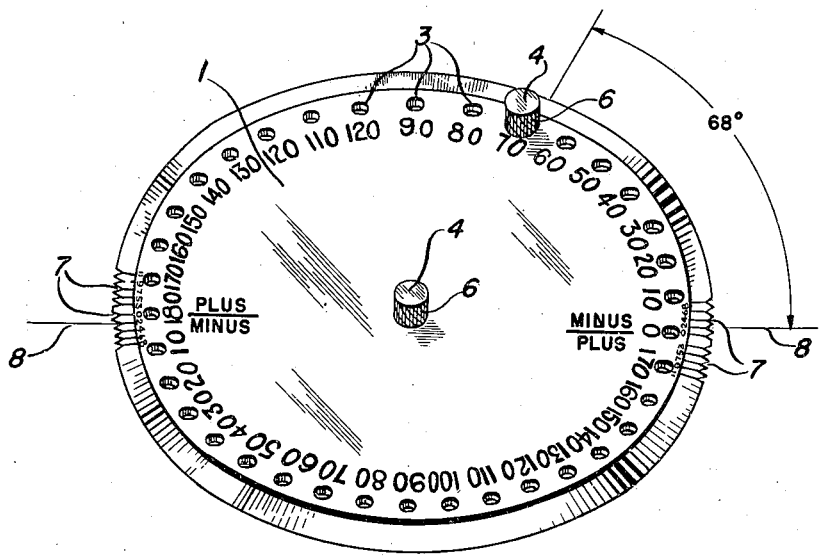
Figure 2:
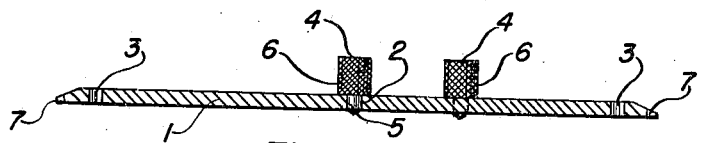

Other and more specific objects will appear in the following detailed description of one form of devices built in accordance with the present invention, having reference to the accompanying drawing, wherein:

Fig. 1 is a perspective view of the device, and
Fig. 2 is a sectional view taken diametrically therethrough.

The device shown provides a fast and accurate method of constructing various angles. It eliminates the use of a supported straight edge, since it is used directly with the base line of the required angle by means of sight cutouts on its opposite edges. It also eliminates geometrical construction with the dividers, which normally takes a comparatively long time, and isn't as accurate.

The present device comprises a circular disc 1, having a beveled edge, a bore 2 at its center and a series of similar bores 3 around its edge at 10 degree intervals. These bores 3 may be marked from 0° to 180° on each half of the disc as shown. One or more center punches 4 may be used in connection with this disc, having shanks 5 of a diameter to fit freely but with close clearance in the bores 2 and 3, and of a length equal to the thickness of the disc. The upper wider portion 6 of the shank may be knurled for convenience in handling.

The disc is provided with groups of sight cutouts or V-shaped notches 7 in diametrically opposed areas on the edge of the disc adjacent the 0–180° axis. Each group of notches is in two sections extending in opposite directions from the said axis. Those sections of the notches running clockwise are designated by odd numbers, while those running in an anticlockwise direction are designated by even numbers. For convenience the odd numbered notches are marked 3° to 11°, while the others range from 0° to 8°. The purpose of this arrangement is to facilitate use of the device in laying out angles of either even or odd number of degrees, as will be explained more fully hereinafter. It is to be noted that the anticlockwise direction of turning the disc is indicated by the word "minus" and the clockwise direction indicated by "plus." The purpose for these markings will be brought out as the operation of the device is explained.

The method of operation is as follows: The base line 8 is drawn and is center punched at the vertex of the required angle. The center bore 2 of the disc is then sighted over this point, and one of the center punches is centered in it. The disc is then turned on the vertex of the angle as a center line until the similarly marked notches in the said respective opposed areas of the disc coincide with the base line. The circumferential bore having the desired angle marking will then be in proper position to mark the point from which a line drawn to the previously determined vertex point will form one side of the angle.

If the desired angle can evenly be divided by 10°, such as 40°, 50°, 80°, etc., then the 0° degree notches on the opposite edges are used to sight on the base line. Sighting one of these 0° notches is sufficient since obviously the other will simultaneously be likewise sighted on the base line at the opposite side of the disc. Another center punch 4 may then be inserted in the bore 3 marked in accordance with the desired angle in the proper direction from the base line, and tapped lightly with a hammer. This point may be similarly obtained with the center punch 4 used in the center of the disc, if only one center punch is used, while the disc is held firmly in place. This point and the one on the base line are then connected to show the other side of the desired angle.

If the desired angle is not evenly divisible by 10°, and if it is an odd number of degrees, the appropriate odd numbered notch 7 is used to sight on the base line and the bore 3 marked with the number to which this odd number must be added to give the required angle is used.

If, in the above case the desired angle is an even number, the appropriate even numbered notch 7 and the bore 3 marked with the number from which this even number must be subtracted to give the required angle, are used in a similar manner to obtain the desired angle. In the illustration in Fig. 1 the required angle is 68°. Thus the disc is turned around the vertex so as to sight the 2° notches on the base line 8, and the 70° bore 3 is used to obtain the desired 68° point since 2° have to be subtracted from 70° to obtain 68°.

The reason the 11° notches are provided instead of 1° notches is because the latter would come too close to the 0° notches for convenient sighting.

Half degree angles can also be obtained accurately with this protractor by first locating the degree angles equally spaced to each side of the half degree angle and then striking an arc from each of the points thus obtained using a common radius. Where these arcs intersect is the point designating the required angle. For example, if the required angle is 66½°, the 66° and 67° points may be first obtained and an arc struck from each of these points with a suitable radius. Where these arcs intersect is the required point denoting the angle of 66½°.

A little study and practice with this device will ensure proficiency and accuracy as well as speed in its use.

Obvious modifications in the construction and arrangement as well as form of the several parts of the device may be made without departing from the spirit and scope of the present invention, as defined in the appended claim.

The invention described herein may be manufactured and used by or for the Government of the United States of America for governmental purposes without the payment of any royalties thereon or therefor.

What is claimed is:

An instrument for laying out angles comprising a circular protractor disc having a bore at its center and similar bores spaced at regular intervals around its circumference marked from 0° to 180° anticlockwise around each half of said disc, and a series of notches in the diametrically opposed areas on the edge of said disc adjacent the 0°–180° axis, spaced at intervals from 0° in one direction from said axis to 8° and from 3° to 11° in the other direction.

BELA VITEZ.

REFERENCES CITED

The following references are of record in the file of this patent:

UNITED STATES PATENTS

| Number | Name | Date |
|---|---|---|
| 679,261 | Johnson | July 23, 1901 |
| 1,301,092 | Bernard | Apr. 22, 1919 |
| 1,329,005 | Neumaier | Jan. 27, 1920 |
| 1,529,293 | Beulwitz | Mar. 10, 1925 |
| 2,049,245 | Breitbarth | July 28, 1936 |